United States Patent
Lee

(10) Patent No.: US 6,424,704 B1
(45) Date of Patent: Jul. 23, 2002

(54) METHOD OF CHARGING A SUBSCRIBER FOR COMMUNICATION SERVICE ACCORDING TO THE USAGE TIME IN A TELECOMMUNICATION SWITCHING SYSTEM

(76) Inventor: Bong-Gu Lee, 327-2, Mangpo-dong, Paltal-gu, Suwon-shi, Kyonggi-do (KR)

( * ) Notice: Subject to any disclaimer, the term of this patent is extended or adjusted under 35 U.S.C. 154(b) by 0 days.

(21) Appl. No.: 09/439,571

(22) Filed: Nov. 12, 1999

(30) Foreign Application Priority Data

Nov. 14, 1999 (KR) .............................................. 99-48948

(51) Int. Cl.$^7$ ........................... H04M 15/00; H04M 3/42

(52) U.S. Cl. .............................. 379/112.01; 379/114.03; 379/114.09; 379/125; 379/128; 379/134; 379/207.03

(58) Field of Search ................................. 379/112, 114, 379/115, 127, 128, 207, 124, 125, 126

(56) References Cited

U.S. PATENT DOCUMENTS

| | | | | | |
|---|---|---|---|---|---|
| 5,185,785 A | * | 2/1993 | Funk et al. | .................. | 379/111 |
| 5,809,121 A | * | 9/1998 | Elliott et al. | ................. | 379/127 |

* cited by examiner

*Primary Examiner*—Binh Tieu
(74) *Attorney, Agent, or Firm*—Klauber & Jackson

(57) ABSTRACT

A communication switching system comprising a first time counter for registering a starting time of a communication service, the first time counter adapted to change the present reference time according to a request given during the communication service, a second time counter for registering the beginning and the ending time of the communication service, the second time counter not responsive to the request to change the present reference time during the communication service, and a main processor for computing a service charge for the communication service based on the time difference between the beginning time and the ending time registered in the second time counter in reference to the starting time registered in the first time counter, wherein a subscriber is charged according to the exact call time used for the communication service.

13 Claims, 4 Drawing Sheets

METHOD OF CHARGING A SUBSCRIBER FOR COMMUNICATION SERVICE ACCORDING TO THE USAGE TIME IN A TELECOMMUNICATION SWITCHING SYSTEM

CLAIM OF PRIORITY

This application makes reference to, incorporates the same herein, and claims all benefits accruing under 35 U.S.C. §119 from an application entitled, Method For Charging A Subscriber For A Communication Service According To Time In A Telecommunication Switching System, filed earlier in the Korean Industrial Property Office on Nov. 14, 1999, and there duly assigned Ser. No. 99-48948.

BACKGROUND OF THE INVENTION

1. Field of the Invention

The present invention relates to a method for charging a subscriber in a telecommunication switching system for the communication service used by the subscriber, and more particularly, to a technique for correctly computing the call service in the switching system.

2. Description of the related art

When a communication service company charges a subscriber for the communication service they provide to their subscribers, it is very important to correctly compute the actual call time used for the communication service since it forms a basis for charging the subscriber. The computation of such call time is usually performed using a clock system provided in the communication switching system. When the clock system does not agree with real time, the clock system can be adjusted manually to the correct time by an operator, or automatically as occasion demands. For example, when the real time is changed due to the daylight savings time, the clock system should be adjusted to reflect such change. However, if the adjustment is made in the middle of call service when the subscriber is connected to the exchange system, the actual call time used by the subscriber can be measured without compensating for the time change when computing the service charge. As a result, a subscriber can experience over or under charge for the same call service.

SUMMARY OF THE INVENTION

It is therefore an object of the present invention to provide an improved computing technique for the communication switching system.

It is another object of the present invention to provide a method for correctly charging a subscriber in a communication switching system for the call service even when the present reference time of the clock system is modified during the call service.

According to one aspect of the present invention, a communication switching system includes a first time counter for registering the starting time of a call service, the first time counter changing the present reference time in response to a command signal during the call service, a second time counter for registering the beginning and the ending time of the call service used by a subscriber, the second time counter being not responsive to the command signal to change the present reference time, and a main processor for calculating the call charge based on the time difference between the beginning time and the ending time registered in the second time counter and the starting reference time registered in the first time counter, so that a subscriber is charged correctly despite the change in the clock system during the call service.

According to another aspect of the present invention, a method for charging a subscriber in a communication switching system for a call service which includes a first and a second time counters, the method comprising the steps of registering the starting time of the call service in the first time counter, registering a duration of the call service in the second time counter, and computing a call charge for the call service based on the starting time registered in the first time counter and the duration of the call service registered in the second counter.

A BRIEF DESCRIPTION OF THE ATTACHED DRAWINGS

A DETAILED DESCRIPTION OF THE PREFERRED EMBODIMENT

In a typical communication switching system, a number of different processors having its own reference time is provided. Depending on the design schemes, each processor serves to perform different functions. Each of the processor performs under its own reference time and has to be calibrated against a real time as occasion demands. The present invention is provided to adjust the reference time of a clock system used for computing a call charge to a subscriber and still provide the correct call charge without being affected by the change in the reference time during a call service.

Figure 1:
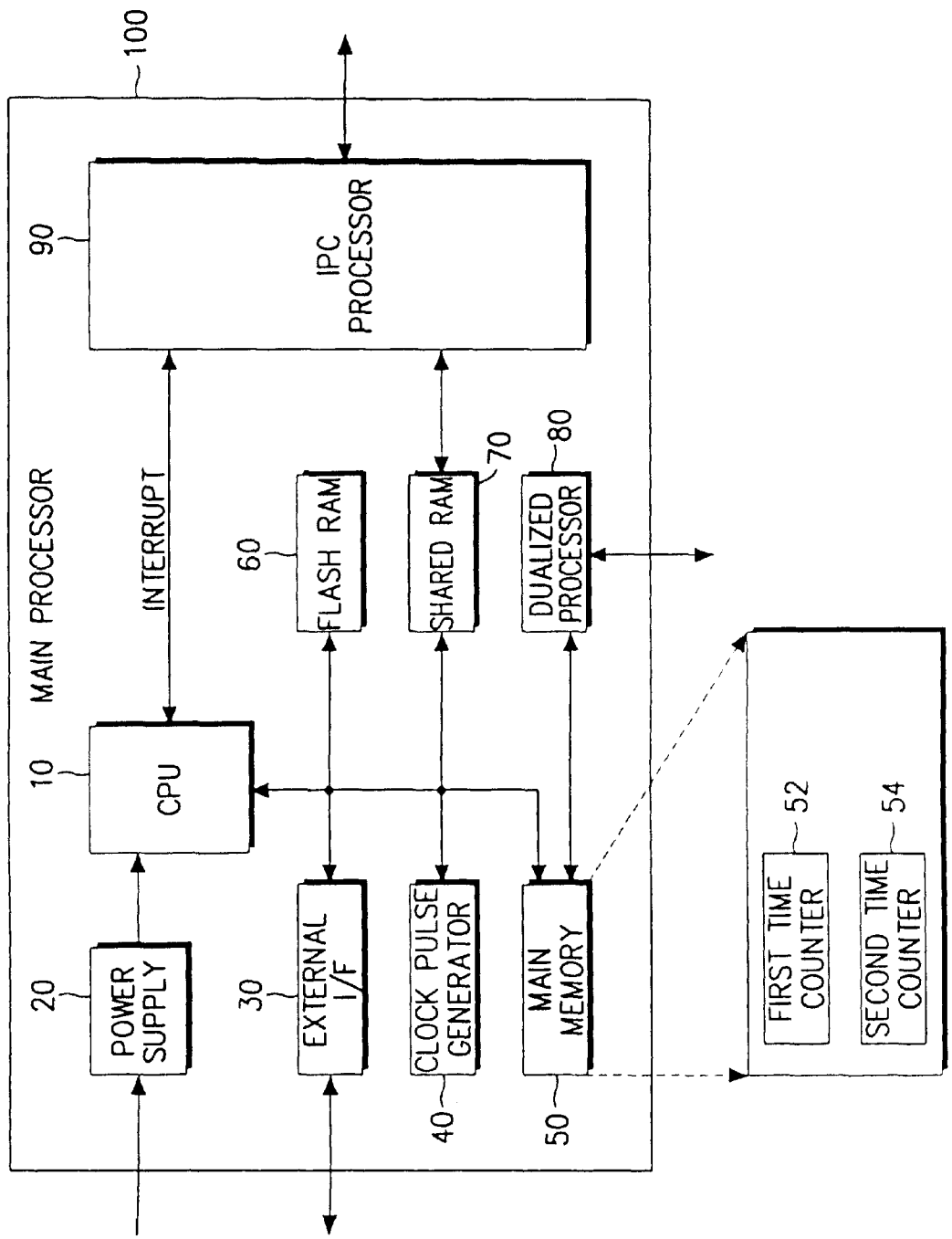
FIG. 1 is a block diagram for illustrating the construction of a main processor of a communication switching system according to the present invention.

Referring to FIG. 1, the present invention relating to a clock system includes a main processor 100 having a CPU 10 for controlling the whole procedure of the clock system, and a main memory 50 for storing the programs, initial service data, and other data required for the operation of the CPU 10. The main memory 50 is provided with a first time counter 52 for storing the starting time of the call service, and a second time counter 54 for storing the duration of the call service used by the subscriber. An external I/F 30 interfaces the main processor 100 with other external devices with different processors of the switching system. A flash RAM 60 is coupled to the external I/F 30 for storing data of the external I/F 30, and a shared RAM 70 is disposed between the clock pulse generator 40 and an IPC processor 90 for storing and sharing common data therebetween. A dualized processor 80 serves to function as a back up processor in the event that the main processor 100 becomes a slave state. A power supply 20 is coupled to the CPU 10, and an IPC processor 90 is provided to interface with other processors of the switching system.

When a clock pulse generator 40 generates clock pulses under the control of the CPU 10, the first time counter counts the number of clock pulses and increases the counting number therein by a predetermined value. In the event that a request for the present reference time is made, the CPU 10 can retrieve the present time as well as the reference year based on the counting number provided in the first time counter 52 of the main memory 50. According to the present invention, the reference time of the first time counter 52 can be modified manually as dictated by the operator of the system, or automatically by the CPU 10 as occasion demands. When a request to modify the reference time is made, the CPU adjust the number of the first time counter to correspond to the new reference time. Such modification of the reference time in the first time counter 52 is desired by the operator for various reasons. For examples, a long-term operation of the switching system may results in a deviation of the reference time from the standard time to necessitate the adjustment. Also, a daylight savings time needs to be considered from time to time which require the need to adjust the reference time. Further, an adjustment is usually required after the initial operation of the switching system to make sure that the reference time for all the devices of the switching system is synchronized.

Moreover, the adjustment of the reference time in the first counter 52 can be implemented automatically if the operator programs such a method to be implemented in the switching system. For example, the operator can programmed to select the reference time commonly shared by the majority of the devices of the system, and command all the devices to be synchronized to that selected reference time. That is, when multiple devices in the switch system operate according to their own reference time and the reference time for each device deviates from one another, the reference time that is most commonly used by the majority of the devices can be programmed to be selected so that all the devices can be requested to set the selected reference time as an universal reference time for the whole system.

The counting number of the second time counter 54 is increased by a predetermined value when the clock pulses from the clock pulse generator 40 is generated. However, the counting number of the second time counter is not changed upon receiving a request to adjust the present reference time as applied to the first time counter 52. Only the first time counter 52 is adjusted to reflect the new reference time, while the second time counter 54 continues to count the number of clock pulses generated from the clock pulse generator. Thus, under the control of the CPU 10, the second time counter records the beginning time and the ending time of the call service used by a subscriber in reference to the new reference time stored in the first time counter. Accordingly, when computing a call charge to a subscriber for the call service, the CPU 10 is provided with two sets of different time, one for indicating the starting time of the call service used by the subscriber, and the other for indicating the duration of the call service used by the subscriber. To this end, the CIP 10 retrieves the starting time stored in the first time counter 52 when the communication service is initiated, and calculates the actual communication time period using the beginning and the ending times stored in the second time counter 54. Even if the present reference time of the system is adjusted in the middle of the call service into a new reference time, the overcharging or undercharging can be prevented because the independent information for the starting time of the call service and the duration of the call service used by the subscriber can be retrieved from the first and the second time counters.

Figure 2:
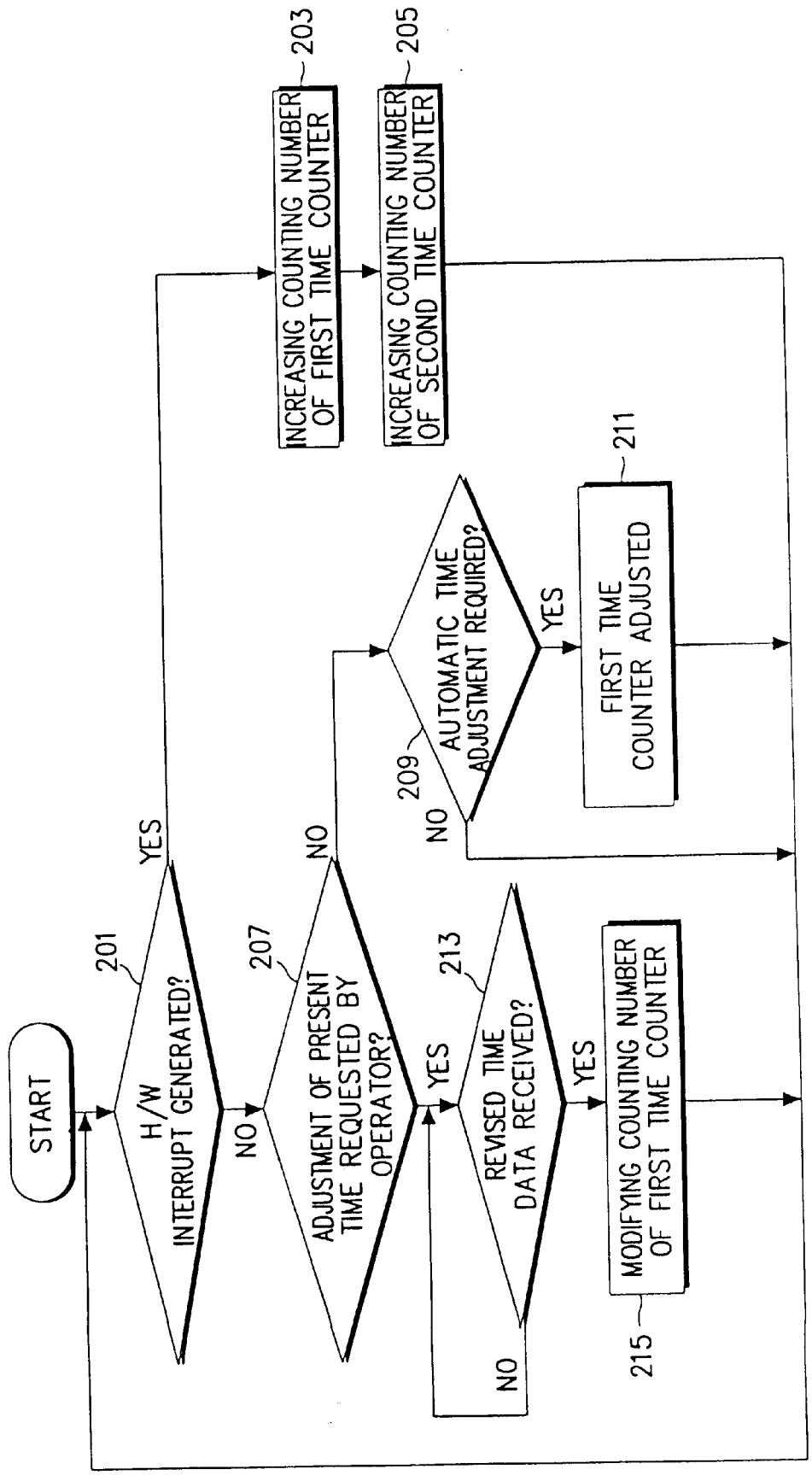
FIG. 2 is a flow chart for illustrating the steps of adjusting the reference time in the first time counter of the communication switching system.

In referring to FIG. 2, when a clock pulse generator 40 generates clock pulses, the CPU 10 proceeds to step 203 to operate the first time counter 52 by increasing its counting number by a predetermined value, and to step 205 to operate the second time counter 54 by increasing its counting number by a predetermined value. That is, the CPU 10 records the starting time when a subscriber connected to the system for the call service in the first time counter 52, and the duration of the service in the second time counter 54 by recording the beginning and the ending time of the call service used by the subscriber. In step 207, if the CPU 10 is asked to adjust the present reference time and receives the revised time data from the operator in step 213, it proceeds to modify the counting number of the first time counter to match the new reference time in step 215. Alternatively, if the system is set to an automatic time adjustment mode in step 209, the CPU 10 adjusts the number of the first time counter as dictated by the automatic mode in step 211. According to the present invention, only the first time counter 52 is adjusted in response to either the manual or automatic request to change the present reference time, and the second time counter 54 does not response to such request. Thus, the CPU 10 increases the counting number of the second time counter 54 by a predetermined value only upon receiving the clock pulses. Thereafter, the CPU 10 continues to operate the first and the second time counters 52 and 54 in the similar steps described in the above.

Figure 3:
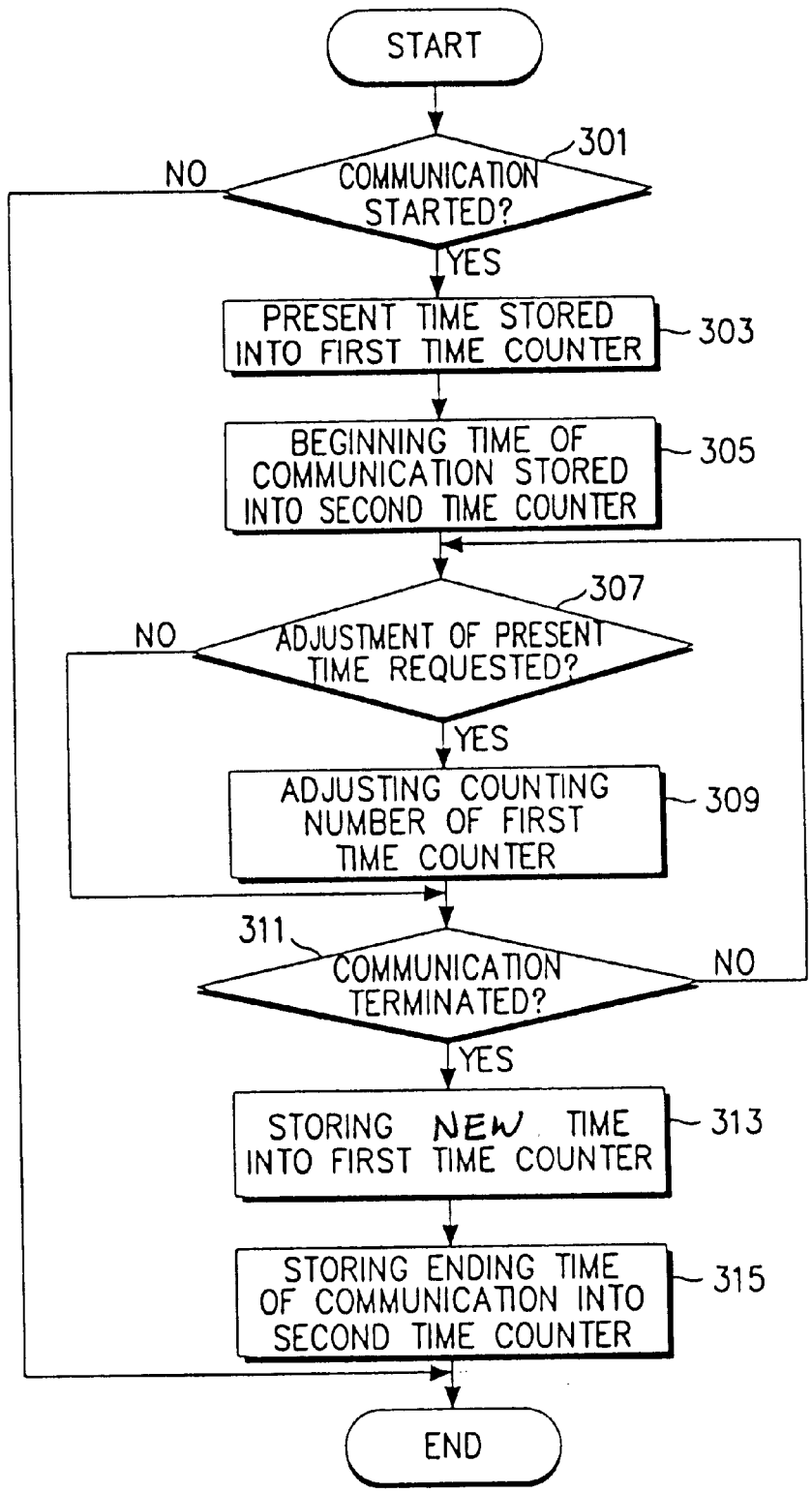
FIG. 3 is a flow chart for illustrating the steps of controlling the time counters when an adjustment is made to the reference time in the communication switching system; and, FIG. 4 is a flow chart for illustrating the steps of computing call charge for the call time using the first and the second counters provided in the communication switching system.

In FIG. 3, the control of the first and second counters during the communication service is illustrated in detail. When a call connection is initiated for a subscriber in step 301, the CPU 10 stores the starting time of the call connection into the first time counter 52 in step 303, and the beginning time of the call service into the second time counter 504 in step 305. Under the control of the CPU 10, the clock pulse generator 40 continues to generate clock pulses to the first time and the second time counter. In the event that the CPU 10 receives a request to adjust the present reference time in step 307, the CPU 10 proceeds to step 309 and adjusts the previously recorded present reference time into a new reference time. In step 309, the CPU 10 adjusts the counting number of the first time counter 52 according to the value prescribed manually by the operator or automatically by the system. In step 311, the CPU determines whether the communication service is terminated for the subscriber, and if the termination of the communication is detected, the CPU 10 stores the newly adjusted reference time into the first time counter 52 in step 313, and stores the ending time of the call service into the second time counter 54 in step 315. Accordingly, when the present reference time is changed during the call service, the counting number of the first time counter 52 is only modified to set to the new reference time, and the second time counter is not modified. The second time counter simply serves to store the beginning and ending times of the call service used by the subscriber.

Figure 4:
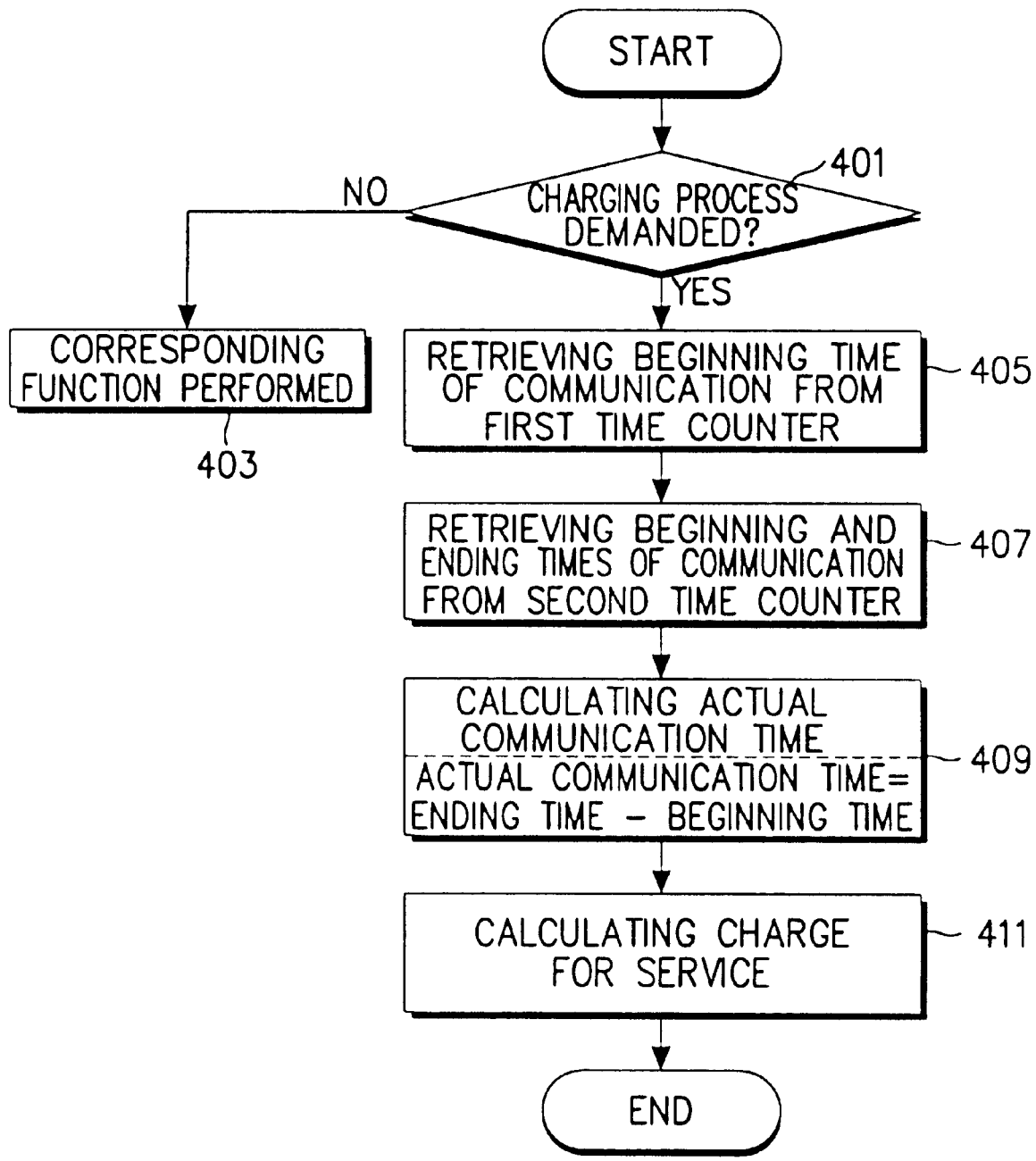

In FIG. 4, the process for computing the call charge to a subscriber for the call time is illustrated in detail. When the charging process is requested in step 401, the CPU 10 proceeds to step 405 to retrieve the starting time of the call service from the first time counter 52, and to step 407 to retrieve the beginning and ending times of the call service from the second time counter 54, or otherwise proceeds to step 403 to perform other corresponding function that is not relating to the computation of the call charge. In step 409, the CPU 10 calculates the difference between the beginning and the ending times retrieved from the second time counter 54 to obtain the actual communication time period taken for a given call service used by a subscriber. The actual communication time period is obtained by subtracting the beginning time of the call time from the ending time of the call time. Finally, in step 411, the CPU 10 calculates the service charge accordingly based on the beginning time data obtained in step 405 and the actual communication time period obtained in step 409.

As apparent from the foregoing, the present invention has an advantage in that the clock system can compute the call charge based on the correct amount of call service used by a subscriber in the event that a reference time of the clock system is changed. Hence, the correct charge can be computed without overcharging or undercharging to the subscriber as in the prior art.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for computing a communication service used by a subscriber in a communication switching system of the type having a pulse generator for generating a clock pulses, wherein a reference time of the system is changed during said communication service, comprising:

a first time counter having said reference time for detecting said clock pulses and for registering a starting time of said communication service, wherein said reference time is adjusted in response to a request to change said reference time during said communication service;

a second time counter for detecting said clock pulses, counting the number of said clock pulses, and registering said starting time of said communication service and an ending time of said communication service, said second time counter not responsive to said request to change said reference time; and, a means for determining a service charge for said communication service based on said starting time registered in said first time counter and the duration of said communication service based on a time difference between said starting time and said ending time registered in said second time counter; wherein said starting time and said ending time registered in said second time counter are not adjusted during said communication service.

2. The apparatus as set forth in claim 1, wherein said means for determining said communication service charge subtracts said starting time registered in said second time counter from said ending time registered in said second time counter.

3. A method for charging a subscriber for a communication service in a communication switching system of the type having a first and a second time counter, said method comprising the steps of:

registering a starting time of said communication service in said first time counter and said second time counter and registering an end time of said communication service in said second time counter, and determining a service charge for said communication service based on said starting time registered in said first time counter and a duration of said communication time based on a time difference of said starting time and said ending time registered in said second counter; wherein said starting time and said ending time registered in said second time counter are not adjusted during said communication service.

4. The method as defined in claim 3, said method further comprising the step of adjusting a present reference time set in said first time counter to a new reference time upon receiving a request to change said present reference time.

5. The method as defined in claim 4, wherein said step of registering said starting time of said communication service in said first time counter further includes the step of storing said new reference time in said first time counter.

6. The method as defined in claim 5, wherein the step of adjusting said starting time is requested manually by an operator or automatically by said switching system.

7. The method as defined in claim 3, wherein the duration of said communication time represents an interval between said starting time and said ending time of said communication service registered in said second time counter.

8. The method as defined in claim 7, wherein said method of determining said communication service change subtracts said starting time registered in said second time counter from said ending time registered in said second time counter.

9. A method for charging a subscriber for a communication service in a communication switching system of the type having a memory means including a first time counter for registering a starting time of said communication service and a second time counter for registering a duration of said communication service, said method comprising the steps of:

initiating said memory means to adjust a present reference time of said first time counter to a new reference time by an operator manually, or automatically by said switching system;

registering said starting time of said communication service in said first time counter and said second time counter and registering an end time of said communication time in said second time counter; and, determining a service charge for said communication service based on said starting time registered in said first time counter and the duration based on a difference between said starting time and said ending time of said communication time registered in said second counter; wherein said starting time and said ending time registered in said second time counter are not adjusted during said communication service.

10. The method as defined in claim 9, wherein said step of registering said starting time of said communication service in said first time counter further includes the step of storing said new reference time in said first time counter.

11. The method as defined in claim 10, wherein the duration of said communication time represents an interval between said starting time and said ending time of said communication service registered in said second time counter.

12. The method as defined in claim 11, wherein said method for determining said communication service change subtracts said starting time registered in said second time counter from said ending time registered in said second time counter.

13. A method for computing a service change for a communication service used by a subscriber in a communication switching system of the type having a first time counter adapted to change a present reference time upon receiving a request during said communication service and a second time counter not responsive to said request during said communication service, said method comprising the steps of:

registering a starting time of said communication service in said first time counter, and registering said starting time and an ending time of said communication service in said second time counter;

retrieving said starting time from said first time counter to set a time frame to set said service charge, and retrieving said starting and said ending times from said second time counter;

obtaining the duration of said communication service based on a time difference time between said starting and said ending times from said second time counter; and, computing said service charge for said communication service based on said starting time retrieved from said first time counter and the duration of said communication service retrieved from said second counter; wherein said starting time and said ending time registered in said second time counter are not adjusted during said communication service.

* * * * *

UNITED STATES PATENT AND TRADEMARK OFFICE
CERTIFICATE OF CORRECTION

PATENT NO. : 6,424,704 B1  Page 1 of 1
DATED : July 23, 2002
INVENTOR(S) : Bong-Gu Lee It is certified that error appears in the above-identified patent and that said Letters Patent is hereby corrected as shown below:

<u>Title page,</u>
Item [73], Assignee, should read as follows: -- Samsung Electronics Co., Ltd., 416 Maetan-Dong, Paldal-Gu, Suwon-City, Kyungki-do Korea, Republic of Korea --

Signed and Sealed this

Twenty-eighth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,424,704 B1  Page 1 of 1
APPLICATION NO. : 09/439571
DATED : July 23, 2002
INVENTOR(S) : Bong-Gu Lee It is certified that error appears in the above-identified patent and that said Letters Patent is hereby corrected as shown below:

Title Page
Item [30], the Foreign Application Priority Date, should read as follows:

--1998-0048948--

Signed and Sealed this

Twenty-ninth Day of January, 2008

JON W. DUDAS
*Director of the United States Patent and Trademark Office*